UNITED STATES PATENT OFFICE.

WILLIAM H. BRABANT, OF SHEBOYGAN, WISCONSIN.

MOISTURE-PREVENTING COMPOSITION.

1,381,788. Specification of Letters Patent. Patented June 14, 1921.

No Drawing. Application filed September 25, 1920. Serial No. 412,734.

*To all whom it may concern:*

Be it known that I, WILLIAM H. BRABANT, a citizen of the United States, and a resident of Sheboygan, in the county of Sheboygan and State of Wisconsin, have invented a new and Improved Moisture-Preventing Composition, of which the following is a full, clear, and exact description.

The present invention relates to new and useful improvements in compositions, and it pertains more particularly to a composition for the treatment of wind-shields, locomotive cab windows, and the like, which are subjected to the elements, and it aims to provide a composition whereby rain and other moisture is caused to flow in a thin even sheet in such a manner as not to obstruct a clear vision through the glass.

It is one of the objects of the present invention to provide a composition of this character in such a manner that the same may be readily applied to the surface to be treated.

The composition consists of a solution of tobacco water combined with sugar, which combination is subsequently combined with paraffin, the paraffin forming the vehicle for the combined tobacco water and sugar.

In carrying out the invention, tobacco and water are united and subjected to a boiling operation until a tobacco water is obtained. This tobacco water is then combined with ordinary white granulated sugar, it being understood that the proportions of tobacco water and sugar are such as to thoroughly saturate the sugar without dissolution thereof. After the sugar has become thoroughly saturated, it is placed in a suitable oven and thoroughly dried, after which it may be reduced to powdered form. After the saturated sugar has become dried and reduced to powdered form, it is combined with molten paraffin, the paraffin being heated to the melting point and the powdered saturated sugar combined therewith. The resultant product is then poured into suitable molds and allowed to cool in such a manner as to form cakes or blocks.

To apply the composition in this form, the cake or block is rubbed upon the surface to be treated until the entire surface has been covered with the composition.

From the foregoing, it will be apparent that the present invention provides means for treatment of windows whereby moisture collected upon the window will be caused to flow in film form in such a manner as not to obstruct a clear vision therethrough.

I claim:

1. A composition of the character described comprising sugar and paraffin combined with tobacco water substantially as herein described.

2. A composition for preventing moisture on windows exposed to the action of the elements, said composition consisting of sugar saturated with a solution of tobacco water, said saturated sugar being dried and comminuted and subsequently combined with a suitable vehicle of a waxy nature.

WILLIAM H. BRABANT.